United States Patent
Hsu

(10) Patent No.: US 6,668,958 B2
(45) Date of Patent: Dec. 30, 2003

(54) CRUISE CONTROL DEVICE FOR MOTOR VEHICLE WITH ADJUSTABLE TRAVELING DISTANCE OF PULLING CORD REEL

(75) Inventor: Charlie Hsu, Kaohsiung (TW)

(73) Assignee: Lite-On Automotive Corporation, Kaoshiung (TW)

( * ) Notice: Subject to any disclaimer, the term of this patent is extended or adjusted under 35 U.S.C. 154(b) by 0 days.

(21) Appl. No.: 10/151,238

(22) Filed: May 21, 2002

(65) Prior Publication Data

US 2003/0217879 A1 Nov. 27, 2003

(51) Int. Cl.[7] ............................................. B60K 31/00
(52) U.S. Cl. ........................ 180/170; 180/179; 180/313; 74/505; 74/506
(58) Field of Search ................................ 180/170, 172, 180/175, 176, 178, 179; 74/505, 506, 502.2, 567, 569

(56) References Cited

U.S. PATENT DOCUMENTS

| | | | |
|---|---|---|---|
| 3,485,316 A | | 12/1969 | Slavin et al. |
| 4,132,284 A | * | 1/1979 | Tomecek ..................... 180/179 |
| 4,170,274 A | | 10/1979 | Collonia |
| 4,221,347 A | * | 9/1980 | Hill ......................... 242/574.3 |
| 4,884,649 A | * | 12/1989 | Onishi et al. ................ 180/179 |
| 5,213,005 A | * | 5/1993 | Nagano, Masashi ........ 74/502.2 |

FOREIGN PATENT DOCUMENTS

| | | | | |
|---|---|---|---|---|
| CA | 2092772 A | * | 9/1994 | ........... B60K/31/00 |
| DE | 3428891 A | * | 2/1986 | ........... B60K/31/00 |

* cited by examiner

*Primary Examiner*—Brian L. Johnson
*Assistant Examiner*—Kelly E Campbell
(74) *Attorney, Agent, or Firm*—Stevens, Davis, Miller & Mosher, LLP.

(57) ABSTRACT

A cruise control device with adjustable traveling distance of pulling cord reel, which is installed in a motor vehicle, and the motor vehicle is driven by an internal combustion engine having a speed control mechanism; the cruise control device of the motor vehicle comprising a running gear, a clutch, a pulling cord reel, and a pulling cord, characterized in that said pulling cord reel comprises: two side walls for forming a groove to accommodate the pulling cord; a middle section having at least two arcs with different radii; wherein the running gear of the cruise control device of the motor vehicle can detach the pulling cord reel by the clutch; an end of the pulling cord is coupled to the pulling cord reel, and the other end to the speed control mechanism; such that the installation of such pulling cord reel can be reversed, and the traveling distance for the cruise control device of the motor vehicle can be changed easily.

3 Claims, 2 Drawing Sheets

CRUISE CONTROL DEVICE FOR MOTOR VEHICLE WITH ADJUSTABLE TRAVELING DISTANCE OF PULLING CORD REEL

BACKGROUND OF THE INVENTION

1. Field of the Invention

The present invention relates to a cruise control device of a motor vehicle, more particularly to a cruise control device of a pulling cord reel used in different models of motor vehicles.

2. Description of Related Art

As the performance of motor vehicles is enhanced unceasingly, the motor vehicles nowadays provide different cruise control devices or speed control systems for keeping the speed of a motor vehicle constant. Such system automatically changes the throttle position in the carburetor or air manifold according to the change of road conditions and keeps the speed of the motor vehicle in a predetermined speed.

A cruise control device adopted by traditional motor vehicles general keeps the movement of motor vehicles in a constant speed by means of a vacuum service converter installed between a vacuum storage tank and a vacuum driving device that are coupled to the air manifold of the engine. However, if this kind of speed controller runs into a road condition having big changes, then it will give rise to a severe change to the position of the throttle and a significant drop in engine performance, meanwhile the constant speed controller also reduces the degree of vacuum of the air manifold, and thus causes a significant drop in engine performance. The previous automatic speed of a motor vehicle or the constant speed control system has been described in the U.S. Pat. No. 3,485,316 entitled "Automobile Speed Control" by Slavin, et al issued on Dec. 23, 1969, and the U.S. Pat. No. 4,170,274 entitled "Device for Regulating the Traveling Speed of a Motor Vehicle" by Colonia issued on Oct. 9, 1979.

Furthermore, many of the currently known cruise control devices used in automobiles comprise a pulling cord reel, being coupled to a throttle link rod by a pulling cord; a driving motor for providing the required displacement of the throttle when the automobile is accelerated or retarded; and a clutch for engaging or detaching the pulling cord reel to/from the driving motor. However, there are changes in specific speeds for different automobiles, and the displacements required by the throttles are different. Therefore, if the same cruise control device is installed in different models of automobiles, it generally cannot match with the speed control mechanism. In another word, it will create the situation of accelerating too fast or retarding too slowly, or even not able to accomplish the predetermined speed.

The prior art also provides a cruise control device for motor vehicles, which makes use of a swinging arm to pull a pulling cord connected to the speed control mechanism of the motor vehicle. By changing the length of the swinging arm, the cruise control device can be installed to different models of motor vehicles. However, when such swinging arm pulls the pulling cord, the pulling force generated will be different according to the different angle of the swinging arm. Therefore, it usually cannot control the speed of the motor vehicle properly. Further, as the pulling cord changes its position according to the swing arm, the pulling cord will be twisted when the swinging arm is reversed. That will damage the cruise control device of the motor vehicle.

In view of the aforementioned shortcomings of the prior arts, there is a need for a cruise control device for motor vehicles that can be used in different models of motor vehicles, and can match with the speed control mechanism of such motor vehicle for controlling the speed of the motor vehicle.

SUMMARY OF THE INVENTION

The primary objective of the present invention is to provide a cruise control device of motor vehicle with adjustable traveling distance of pulling cord reel, which is installed in the cruise control device of the motor vehicle and such cruise control device can be installed in different models of motor vehicles and match with the speed control mechanism of such motor vehicle.

The secondary objective of the present invention is to provide a cruise control device of motor vehicle with adjustable traveling distance of pulling cord reel capable of smoothly moving the pulling cord between the constant speed deice and the speed control mechanism of the motor vehicle.

To attain the foregoing purpose, the cruise control device of motor vehicle with adjustable traveling distance of pulling cord reel according to the present invention is installed in a motor vehicle, and the motor vehicle is driven by an internal combustion engine having a speed control mechanism; the cruise control device of the motor vehicle comprising a running gear, a clutch, a pulling cord reel, and a pulling cord, characterized in that said pulling cord reel comprises: two side walls for forming a groove to accommodate the pulling cord; a middle section having at least two arcs with different radii; wherein the running gear of the cruise control device of the motor vehicle can detach the pulling cord reel by the clutch; an end of the pulling cord is coupled to the pulling cord reel, and the other end to the speed control mechanism; such that the installation of such pulling cord reel can be reversed, and the traveling distance for the cruise control device of the motor vehicle can easily be changed.

According to another characteristic of the cruise control device for motor vehicle with adjustable traveling distance of pulling cord reel of the present invention, the middle section of the pulling cord reel is a spiral.

According to another characteristic of the cruise control device for motor vehicle with adjustable traveling distance of pulling cord reel of the present invention, the cruise control device has a fixing device for fixing the pulling cord and a leading wall for leading the direction of the pulling cord.

By the arrangement of the cruise control device of motor vehicles with adjustable traveling distance of pulling cord reel of the present invention, the cruise control device for motor vehicle can be installed in different models of motor vehicles easily for its application, and can match with the speed control mechanism of the motor vehicle.

To make it easier for our examiner to understand the aforementioned and other objectives, innovative features, and advantages of the present invention, we use a preferred embodiment together with the attached drawings for the detailed description of the invention.

BRIEF DESCRIPTION OF THE DRAWINGS

Other objects, features, and advantages of the invention will become apparent from the following detailed description of the preferred but non-limiting embodiment. The description is made with reference to the accompanying drawings, in which.

DESCRIPTION OF THE PREFERRED EMBODIMENT

Figure 1:
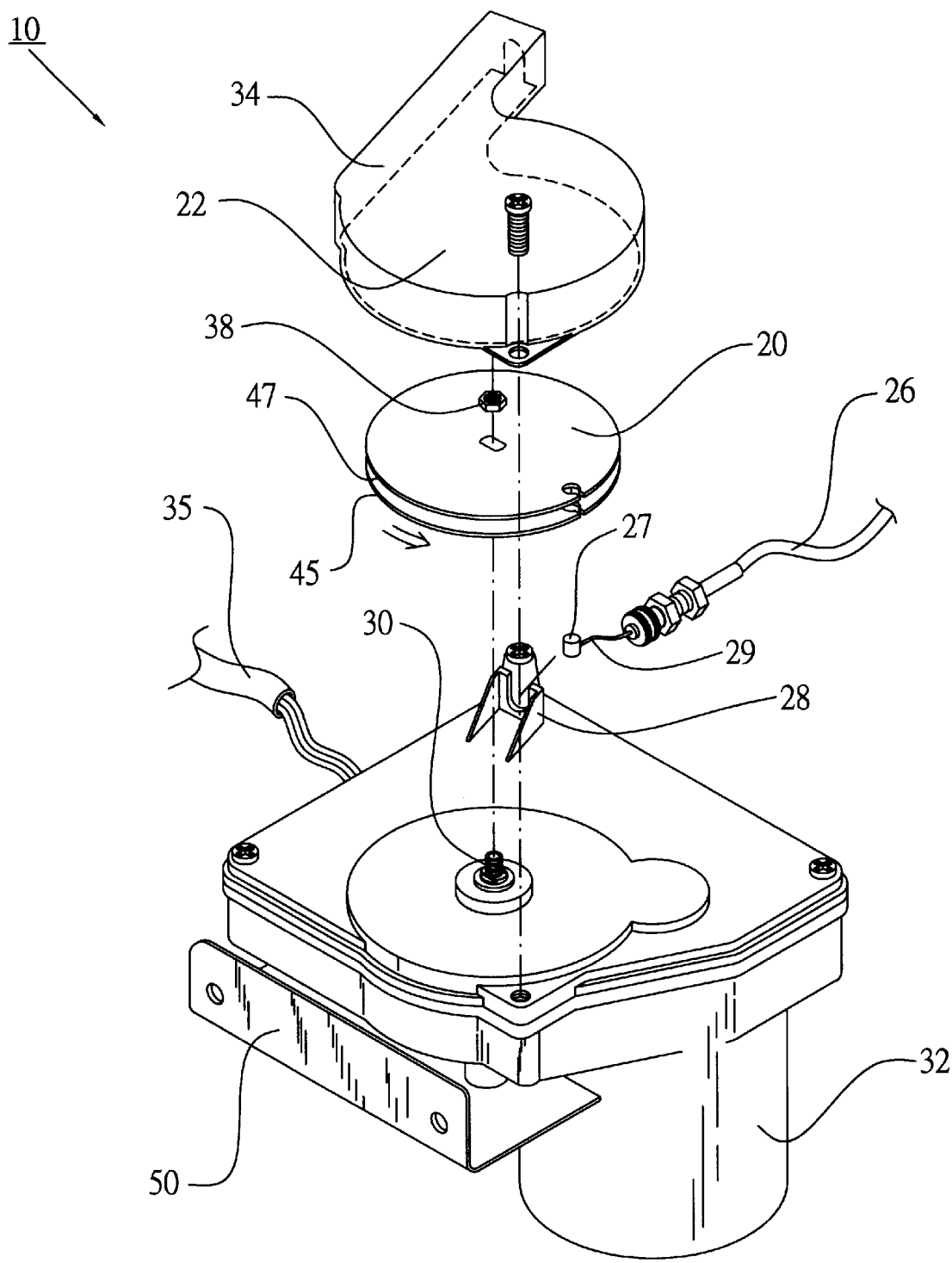
FIG. 1 is the explosive view of the cruise control device for motor vehicle with adjustable traveling distance of pulling cord reel according to a preferred embodiment of the present invention.

Please refer to FIG. 1, which shows the explosive view of a cruise control device 10 of a motor vehicle. Generally, such motor vehicle is driven by an internal combustion engine having a speed control mechanism for controlling the velocity of the motor vehicle. The cruise control device 10 of the motor vehicle comprises a main body 32, a pulling reel 20, a speed pulling cord 26, and a cover 22. Those skilled in the art understand that the main body 23 comprises a driving motor, a clutch, a gear wheel, and a control circuit. The main body 32 is fixed to the motor vehicle by a prop 50. The control circuit of the main body 32 is coupled to the constant speed controller in the driver seat by the control line 35 for controlling the cruise control device 10 of the motor vehicle. When the driver sets the constant speed, the clutch of the main body 32 will be engaged. By means of the clutch and the gear wheel, the driving bolt 30 on the main body 32 is driven by the motor. On the other hand, when the driver releases the constant speed, the clutch of the main body 32 will be released, and then the driving bolt 30 can return to a specific radial position by a device similar to a spring. Please refer to FIGS. 1, 2, and 3. The pulling cord reel 20 is constituted by two circular boards 45, 47 and a middle section 43; the two circular boards 45, 47 have an aligned opening 46 and form two side walls for accommodating a cable wire. The middle section has two arcs 42, 44 with different radii as shown in the figure. The radius of the arc 42 is larger than that of the arc 44. The pulling cord reel 20 is fixed to the driving bolt 30 of the main body 32 by the nut 38. The speed pulling cord has a suspending member 27 and a cable wire 29. The suspending member 27 can be infixed into the opening 46 of the pulling cord reel 20 such that a part of the cable wire 29 is disposed between the two circular boards 45, 47, and the other end of the cable wire 29 is coupled to the speed control mechanism of the motor vehicle.

Figure 2:
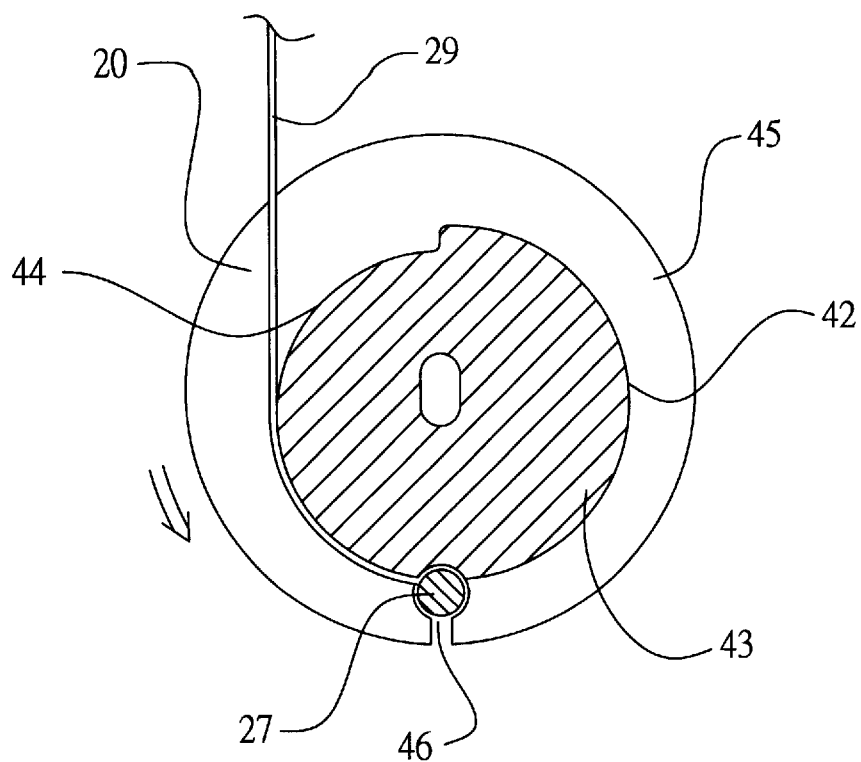
FIG. 2 is a cross-sectional diagram of the cruise control device for motor vehicle with adjustable traveling distance of pulling cord reel according to a preferred embodiment of the present invention showing the connection of a pulling cord reel and a cable wire in the same direction.
Figure 3:
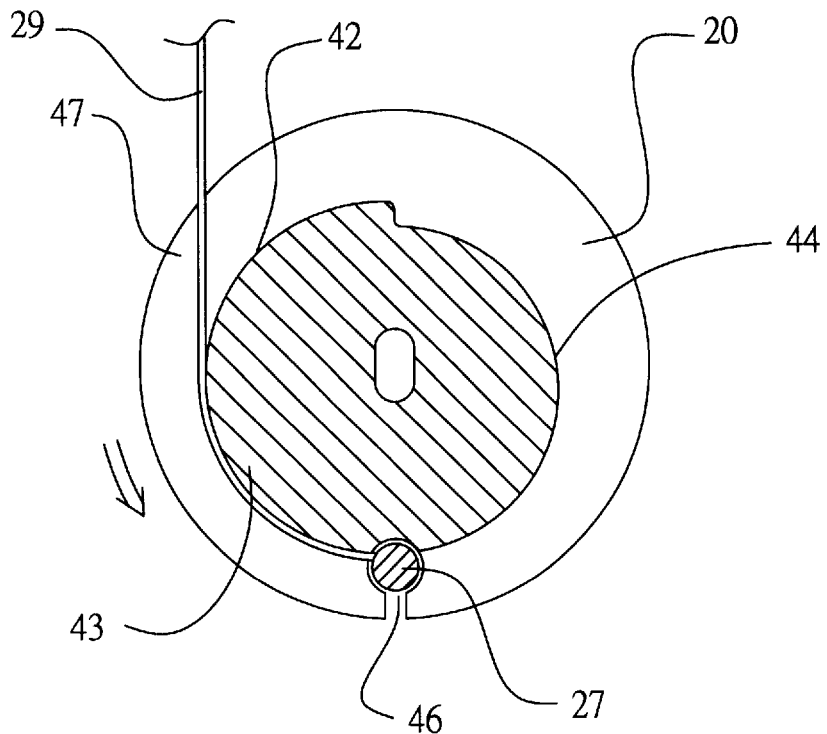
FIG. 3 is the cross-sectional diagram of the cruise control device for motor vehicle with adjustable traveling distance of pulling cord reel according to the present invention showing the connection of a pulling cord reel and a cable wire in another direction.

As mentioned above, when the driver sets the constant speed, the control circuit of the main body will rotate the driving motor, and in turn rotate the pulling cord reel 20 to a specific radial position by the driving bolt 30, so that the cable wire 29 of the speed pulling cord 26 is pulled to a distance in order to control the speed of the motor vehicle to the current speed. However, the traveling distances required by the speed control mechanism for different motor vehicles, i.e. the distances pulled by the cable wire 29 are different. When the pulling cord reel 20 is installed to the cruise control device of the motor vehicle in the direction as shown in FIG. 2, the cable wire 29 wraps around the arc 44 with smaller radius. In another word, when the driving bolt 30 rotates to a specific angle (as indicated by the direction of the arrow in the figure). The distance pulled by such wire cable 29 is shorter. On the other hand, when the pulling cord reel is installed to the cruise control device 10 of the motor vehicle, the cable wire 29 wraps around the arc 42 with larger radius. In another word, when the driving bolt 30 rotates to a specific angle (as indicated by the direction of the arrow in the figure). The distance pulled by such wire cable 29 is larger.

Therefore the cruise control device 10 can be installed to different models of motor vehicles easily and match with the speed control mechanism of the motor vehicle by reversing the pulling cord reel 20 and making use of the two arcs with different radii. Those skilled in the art can understand that different kinds of arcs cannot be used for their installation in the pulling cord reel. For example, the middle section of the pulling cord reel can be spiral, and the opening 46 cannot be disposed on different radial position. In such arrangement, the cable wire 29 can be pulled to different traveling distances when the driving bolt 30 rotates to a specific angle.

Furthermore, when the cruise control device 10 of the motor vehicle adopts the pulling cord reel 20 according to the present invention, since the relative position of the speed pulling cord 26 and the pulling cord reel 20 have not changed, i.e. no matter how the pulling cord reel 20 is rotated, the cable wire 29 will be pulled but will not change the angle relative to the speed pulling cord 26. Therefore, the speed pulling cord 26 can be fixed securely to the main body 32 by the fixing device 28. Further, since the cable wire 29 is disposed between the fixing device 28 and the pulling cord reel 20, therefore a side wall 34 on the cover 22 can lead the cable wire 29 easily. Thus, when the driver releases the constant speed setting and the driving bolt 30, the cable wire 29 leads the direction for the side walls 34, but will not be twisted that may cause failure to the cruise control device 10 of the motor vehicle.

Since the middle section of the pulling cord reel 20 of the cruise control device 10 of motor vehicle according to the present invention has different radii, therefore the cruise control device 10 of the motor vehicle can be installed to different models of motor vehicles, and also can match with the speed control mechanism of the motor vehicle.

While the present invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A cruise control device with adjustable traveling distance of pulling cord reel, being installed in a motor vehicle, and the motor vehicle being driven by an internal combustion engine having a speed control mechanism; the cruise control device of the motor vehicle comprising a running gear, a clutch, a pulling cord reel, and a pulling cord, characterized in that said pulling cord reel comprising: two side walls for forming a groove to accommodate the pulling cord; a middle section having at least two arcs with different radii; wherein the running gear of the cruise control device of the motor vehicle can detach the pulling cord reel by the clutch; an end of the pulling cord being coupled to the pulling cord reel, and the other end to the speed control mechanism; such that the installation of such pulling cord reel can be reversed, and the traveling distance for the cruise control device of the motor vehicle can be changed easily.

2. The cruise control device with adjustable traveling distance of pulling cord reel as claimed in claim 1, wherein said middle section of the pulling cord reel is a spiral.

3. The cruise control device with adjustable traveling distance of pulling cord reel as claimed in claim 1, wherein said cruise control device for motor vehicle further comprising a fixing device for fixing the pulling cord, and a leading wall for leading the direction of the pulling cord.

* * * * *